United States Patent [19]

Moore et al.

[11] Patent Number: 5,535,190

[45] Date of Patent: Jul. 9, 1996

[54] DRIVER SYSTEM FOR AN UPDATABLE OPTICAL STORAGE-MEDIA

[75] Inventors: Arthur R. Moore, Deer Park, Wis.; Donald E. Gustafson, North St. Paul, Minn.

[73] Assignee: Minnesota Mining and Manufacturing Company, St. Paul, Minn.

[21] Appl. No.: 441,338

[22] Filed: May 15, 1995

Related U.S. Application Data

[63] Continuation of Ser. No. 218,619, Mar. 28, 1994, abandoned.

[51] Int. Cl.$^6$ ........................................... G11B 21/00
[52] U.S. Cl. .......................... 369/295.200; 369/44.380; 369/56; 369/283
[58] Field of Search .......................... 369/275.2, 275.4, 369/275.3, 283, 286, 278, 44.38, 55, 13, 15, 44.11; 428/327, 913, 900

[56] References Cited

U.S. PATENT DOCUMENTS

| | | | |
|---|---|---|---|
| 2,950,971 | 8/1960 | Lewin | 430/17 |
| 3,782,947 | 1/1974 | Krall | 430/21 |
| 4,279,945 | 7/1981 | Audran et al. | 427/130 |
| 4,843,494 | 6/1989 | Cronin et al. | 369/14 |
| 4,949,332 | 8/1990 | Veenis et al. | 369/275.3 |
| 4,967,306 | 10/1990 | Hampl, Jr. et al. | 361/323 |
| 5,067,039 | 4/1991 | Goodwin et al. | 369/14 |
| 5,120,927 | 6/1992 | Williams et al. | 209/121.68 |
| 5,144,552 | 9/1992 | Abe | 369/275.3 |
| 5,155,372 | 5/1992 | Hampl, Jr. et al. | 361/323 |
| 5,185,238 | 2/1993 | Oikawa | 430/523 |
| 5,215,874 | 6/1993 | Sakakibara | 430/496 |
| 5,217,804 | 6/1993 | James et al. | 428/329 |
| 5,229,259 | 7/1993 | Yokota | 430/523 |
| 5,250,404 | 10/1993 | Sakakibara | 430/523 |
| 5,254,446 | 10/1993 | Ikenoue et al. | 430/503 |
| 5,254,449 | 10/1993 | James et al. | 430/533 |
| 5,291,462 | 3/1994 | Richards | 369/14 |
| 5,305,301 | 4/1994 | Ohga | 369/275.3 |
| 5,305,302 | 4/1994 | Hardwick | 369/275.3 |
| 5,336,589 | 8/1994 | Mukunoki et al. | 430/501 |

FOREIGN PATENT DOCUMENTS

| | | |
|---|---|---|
| 686172 | 5/1964 | Canada . |
| 0434230A2 | 6/1991 | European Pat. Off. . |
| 0535652A1 | 4/1993 | European Pat. Off. . |
| 0561000A1 | 9/1993 | European Pat. Off. . |
| 0564187A2 | 10/1993 | European Pat. Off. . |
| 0603582A1 | 6/1994 | European Pat. Off. . |
| 59-198549 | 11/1984 | Japan . |
| 60-242533 | 12/1985 | Japan . |
| 62-162259 | 7/1987 | Japan . |
| 63-115535 | 5/1988 | Japan . |
| 63-157339 | 6/1988 | Japan . |
| 1-294244 | 11/1989 | Japan . |
| 4-214217 | 8/1992 | Japan . |
| 5-144118 | 6/1993 | Japan . |
| 5-242469 | 9/1993 | Japan . |
| 60-20331 | 1/1994 | Japan . |

OTHER PUBLICATIONS

IBM Technical Disclosure Bulletin vol. 22 No. 3, Aug. 1979 Bence et al. pp. 683.

"Optical Servo of Magnetic Recording," Hoagland, *IBM Technical Disclosure Bulletin*, vol. 20, No. 10, Mar. 1978, pp. 4108–4109.

*Primary Examiner*—David C. Nelms
*Assistant Examiner*—Tan T. Nguyen
*Attorney, Agent, or Firm*—Gary L. Griswold; Walter N. Kirn; H. Sanders Gwin, Jr.

[57] ABSTRACT

The invention is a recording system for recording and playing back information stored on an updatable optical storage medium. In the optical storage medium digital data is permanently present in the form of replicated features, and an updatable capability is provided by including an additional layer of substantially transparent magnetic recording material, The invention further includes a method for recording and playing back the information from the optical storage medium.

6 Claims, 4 Drawing Sheets

DRIVER SYSTEM FOR AN UPDATABLE OPTICAL STORAGE-MEDIA

This is a continuation of application Ser. No. 08/218,619 filed Mar. 28, 1994 now abandoned.

FIELD OF THE INVENTION

This invention relates to optical storage media, especially of the type generally referred to as CD-ROM media in which digitally encoded data is provided in the form of non-alterable, replicated embossures on a rigid, transparent substrate.

BACKGROUND OF THE INVENTION

CD-ROM (compact disk read-only-memory) media have achieved widespread acceptance in recent years as a very high density storage medium for use with personal computers. Formatted storage capacities of about 550 Mbytes on a 12 cm diskette are routinely achieved. A common CD-ROM diskette is very similar in appearance and construction to a compact digital audio disc, and comprises a plastic substrate having a circular or spiral pattern of grooves, more specifically, a series of pits surrounded by land areas, replicated on a surface and in which digitized data or information is conveyed by alterations in the grooved pattern. Such media are typically prepared by first making a master disc via optically scanning a substrate coated with a photo resist and then removing nonhardened resist to produce the desired grooved pattern. Such masters, or second generation stampers made from the masters are then used in production stamping equipment to replicate the grooves onto plastic substrates.

In particular, such master discs may be coated with a metallic layer, such as copper, in which the grooves are formed by well-known photo resist techniques, while the second generation stampers are formed by nickel-plating and molding operations. Upon producing the final replicated surface in a production disc, that surface may be overcoated with a reflective layer, i.e., a thin-film of metal, aluminum or the like, that layer in turn overcoated with a protective layer, and a printable layer placed thereover. During playback, a laser is focused through the transparent rear surface onto the reflective layer, and reflected light modulated by the grooved pattern is detected. Small scratches and dust on the light incident surface have little effect on signal quality as they are out of focus.

The spiral tracks on such discs are generally played from the center out while initially rotating at about 500 rpm and gradually slowing to about 200 rpm, maintaining a constant linear velocity of about 1.25 m/sec. Following detection, the playback signal is error corrected and ultimately fed to appropriate converters, computers and playback/display devices.

As no physical contact with the tracks is allowed, tracking of the laser beam is provided by optical servoing techniques. Track densities exceeding 15,000 tracks per inch are routinely achieved. Servo information along with user specific data is typically provided via the differing reflectivities of the lands and pits, respectively, making up the spiral pattern. The output from an optical sensor is separated into user data and servo data components, and the latter is coupled in a feed-back loop to sensor positioning devices which maintain the sensor centered on the respective track.

Unlike competitive storage media such as magnetic tapes and discs, solid state memories, etc., all of which can and are routinely erased and re-recorded to provide additional and/or updated information, CD-ROM media discussed above are limited in that the information provided at the time of manufacture cannot be altered to add additional or update information. Rather, entirely new masters and stampers must be produced in order to provide discs containing desired new information.

SUMMARY OF THE INVENTION

The present invention includes a digitally encoded optical recording medium carrying a digitally encoded, detectable pattern in the form of replicated features, but further, in which an updatable capability is provided by including an additional layer of substantially transparent magnetic recording material. In one aspect, the present invention thus comprises an updatable, radiation detectable, information storage medium which comprises a substrate, at least one surface of which carries a digitally encoded, radiation detectable pattern in the form of replicated features, and a magnetizable, substantially transparent magnetic recording layer. Preferably, at least one layer is provided adjacent the patterned surface of the substrate. This layer is preferably reflective so that a beam of radiation modulated by the patterned surface of the substrate will be reflected. When using such a medium, radiation such as a beam of light may be directed through the magnetizable layer to read the detectable pattern and additional information may be magnetically recorded on and played back from the magnetizable layer.

Preferably, the substrate is a substantially rigid and planar polymeric sheet. The magnetizable layer is positioned over that pattern such that the optically detectable pattern may be sensed by a light beam directed toward the outer surface of the magnetizable layer. Alternatively, if the substrate is transparent, the magnetizable layer may be positioned adjacent to an opposite surface of the substrate such that the optically detectable pattern may be sensed by a light beam directed toward the opposite surface and passed through the substrate.

Preferably, the magnetizable layer includes a coating of magnetic particles, e.g., barium ferrite, dispersed in a polymeric binder. A preferred coating comprises a dispersion of substantially platelike barium ferrite particles having an average planar dimension in the range of 0.02 to 0.20 µm and thickness in the range of 0.004 to 0.1 µm, and has a transparency at 780 nm of greater than 40%.

Also, the medium may include a rigid or flexible disk-shaped substrate having on one surface thereof concentric or spiral tracks containing optically encoded information. Optionally, the medium may also be tape-like, having on one surface thereof a plurality of parallel tracks bearing the optically detectable pattern.

In one embodiment, a polymer layer is provided between the patterned side of the substrate and the magnetizable layer. The polymer layer preferably comprises polyethylene terephthalate and is less than 25 µm thick.

The present invention also includes a recording system for recording and playing back the medium described above. The system includes an optical sensor, a magnetic recording/playback head, and means for transporting the medium past the sensor and head. The optical sensor senses radiation directed through the magnetizable layer of the medium which has been modulated and reflected by the reflective layer adjacent the patterned surface of the medium. The magnetic head records/plays back information in the magnetizable layer of the medium.

In one embodiment, the optical sensor and magnetic head are positioned on opposite sides of the medium. The pattern may include servo tracks, whereby the optical sensor follows the servo tracks and positions the magnetic head appropriately. The pattern may also include information which is sensed by the optical sensor, and the magnetic head can be used to record or playback additional information in the magnetizable layer in the medium.

The present invention also includes a method of playing back, e.g., retrieving information, from the medium described above. The method includes the steps of transporting the medium past the optical sensor and magnetic head; sensing information stored in the pattern on the medium with the optical sensor; and playing back additional information stored in the magnetizable layer with the magnetic head.

In another aspect, the present invention comprises a method of updating such a medium by magnetically recording update information on the magnetizable layer, while previously provided optically encoded information is recovered by directing a beam of light through the magnetizable layer and onto the optically detectable pattern. Where the optically detectable pattern includes servo tracking information, such a method may further comprise optically detecting the servo tracking information by means of a beam of light and using the detected information to control the position of both the beam of light and a magnetic recording head on the medium.

Where the optically encoded pattern comprises signals for servo tracking, identifying specific record positions on the media, and user specific data, all in read-only-memory form, the method further comprises detecting and decoding the optically encoded pattern, storing in separate memories signals corresponding to each of said signals, controlling the position of the beam of light and the position of a magnetic recording head during normal playback operations in response to a servo tracking signal, positioning the light beam and head at a desired record location in response to played back user specific dam, and magnetically recording additional or update signals on the magnetizable layer at positions dictated by the servo tracking signals and the record position signals.

DETAILED DESCRIPTION

Figure 1:
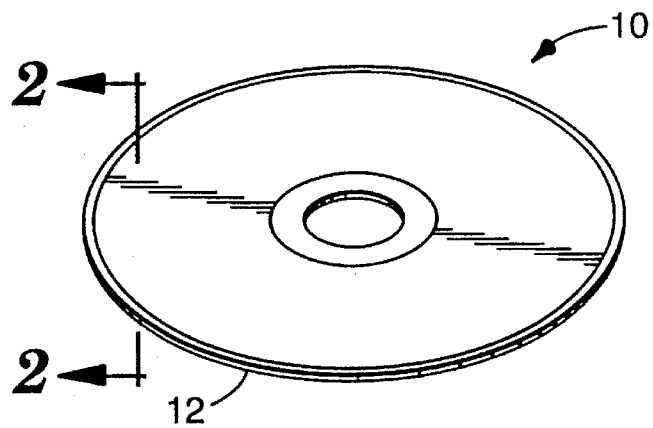
FIG. 1 is a perspective view of a prior art CD.
Figure 2:
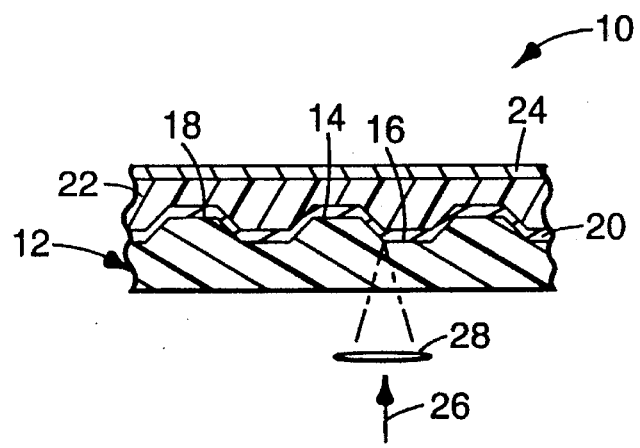
FIG. 2 is a cross-section of the prior art CD of FIG. 1.

Optical recording media of the type commonly referred to as compact discs are now quite commonplace, being widely used in audio and video recording applications as well as in CD-ROM applications. As shown in FIGS. 1 and 2, such media 10 typically comprise a substrate 12, such as a sheet of polycarbonate, one surface 14 of which is replicated to carry a pattern of pits 16 and lands 18 representative of digitally encoded information. The replicated surface 14 is in turn covered by a metalized reflecting layer 20, and that layer in turn covered by a protective layer 22. The outer surface of the protective layer 22 may be covered by appropriate labels or printing inks 24, and the like. In typical uses, a light beam 26 will be directed through a lens system 28 toward the bottom surface of the polycarbonate sheet 12 and focussed onto the replicated surface 14. Light reflected from that surface modulated by the differences in reflection from the pits and lands respectively is then detected by appropriate optical detectors.

In such media, the pits and lands representing digitally encoded information are arranged along a spiral (or concentric) track(s). During playback, the light beam may be maintained centered over the track by a pair of photodiodes responsive to the amount of light received from each side of the track, the output from which controls a servo system comprising a light-beam/detector-positioning mechanism.

Such media encoded with audio and video programming have become widely accepted and CD-ROM media are rapidly gaining in popularity. Particularly when viewed as a source of nonentertainment-oriented data, such media suffer from an interesting property, particularly when compared to their technical predecessor, magnetic recording media. Unlike magnetic media, the information contained in the replicated pattern of pits and lands is permanent and cannot be altered. CD media cannot be erased, nor can additional information be added to update the already included information. For example, when the information is a catalogue or encyclopedia, even a slight revision requires that entirely new discs be prepared.

The present invention addresses this major drawback. As shown in the cross-sectional view of FIG. 3, media 30 of the present invention comprise an optically detectable portion 32, which may be substantially like the CD described in FIGS. 1 and 2, to which is added a layer 34 of magnetic recording material. Optically detectable portion 32 comprises a substrate 36 having a replicated, such as an embossed, surface 38 containing lands and pits, 40 and 42, respectively, thus carrying the digitally encoded detectable information bearing pattern. As in the previous Figures, the medium 30 may also preferably include a protective overlayer 44 and a topmost label or other printed indicia 46. While a substrate of polycarbonate has been shown, it will be appreciated that alternative materials may likewise be used. Thus, for example, a readily embossible material of either thermoplastic or thermosoftenable material is suitable. And, while a unitary construction may be preferred, the substrate may alternatively be a composite in which only the topmost layer is embossible. The reflective layer, while typically comprising an alloy of aluminum, may be any of a variety of reflecting materials, such as chromium, silver, gold, nickel, iron, tantalum rhodium, tin, indium, alloys of such metals, etc.

Figure 3:
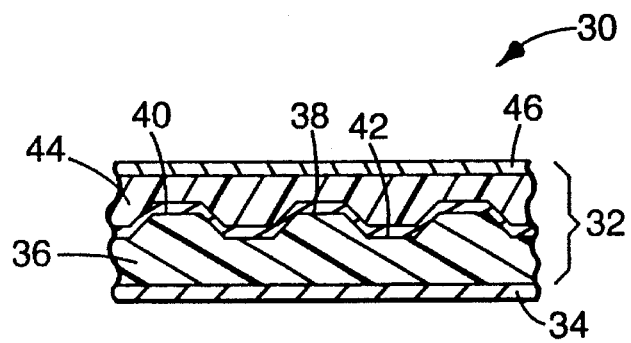
FIG. 3 is a cross-section of one embodiment of a medium according to the present invention.

Of particular concern to the present invention is the layer 34 of magnetic recording material. In the embodiment of FIG. 3, that layer is applied to the underside of the substrate 36, i.e., the surface through which a light beam is typically directed when reading out the optically detectable embossed pattern. It will thus be appreciated that the layer 34 is not only magnetizable, like that of conventional magnetic recording media, but is also substantially radiation transparent, so that a beam of radiation may be directed though it. Details of such layers are set forth hereinafter.

Since the magnetizable layer 34 is radiation transparent, e.g., optically transparent, the same pattern of lands and pits employed for servo controlling the relative position of the position of the light-beam/optical detector assembly with respect to the pattern, i.e., tracking the optically encoded pattern, can now be employed for controlling the position of a recording/playback magnetic head. And, much higher tracking densities may be achieved using the optically transparent magnetic recording layer/CD-ROM combination, as the position control obtainable from such optical tracks is significantly more precise than that typically obtainable from magnetic media alone. While conventional magnetic media in disc form offer track densities up to about 55 tracks/cm, the media of the present invention provided for track densities in the magnetic layer of from about 80 to 5,000 tracks/cm. This translates to a storage capacity of from about 40 Mbytes to about 475 Mbytes for the magnetic layer alone. As the formatted capacity of a typical CD-ROM disc is about 550 Mbytes, this added capacity of from about 40 to 475 Mbytes of additional updatable information greatly increases the capacity as well as the versatility of the present medium.

Figure 4:
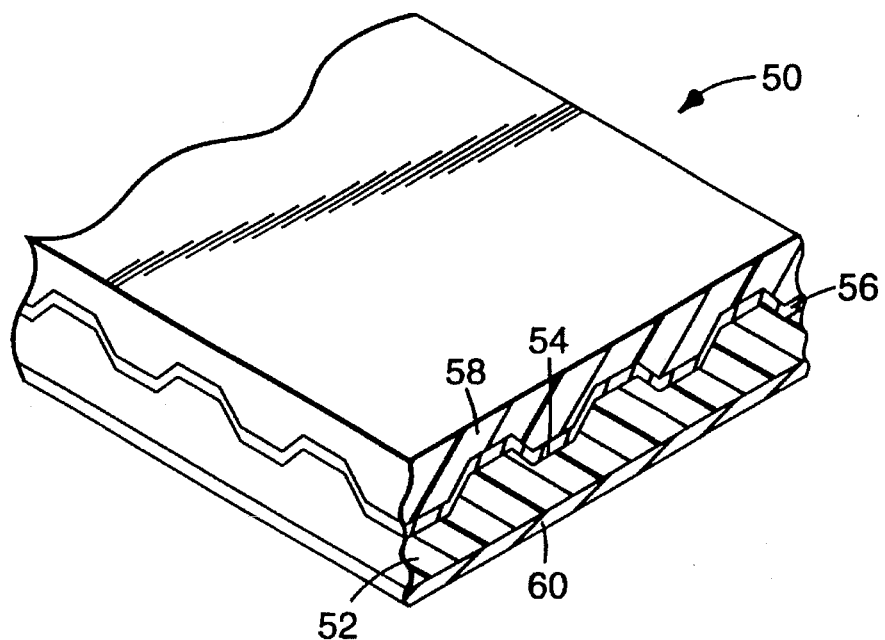
FIG. 4 is a cross-section of another embodiment of the present invention useful as a tape-like medium.

In addition to disc-shaped media as described in conjunction with the above Figures, the media of the present invention may also be provided in a tape configuration. As shown in FIG. 4, such a medium 50 may comprise an elongated strip of a flexible, transparent substrate 52, an upper surface 54 of which has been embossed or otherwise provided with a pattern of replicated features representing digitally encoded, optically detectable information. As with disc-like media, the replicated surface is desirably overcoated with a reflective layer 56, a protective overcoat 58, and a topmost label or printed indicia (not shown). In such media, the tracks will be configured along the length of the tape, either longitudinally, such as in a serpentine recorded format, or in a helical pattern, such as in conventional video recording. In any event, the medium 50 includes a layer of transparent magnetic recording material 60 affixed to the lower surface of the substrate 52.

In an alternative embodiment, the medium of the present invention may have the transparent magnetic recording layer adjacent the side of the substrate having the replicated features. In such an embodiment, a light beam may still be directed from the bottom to retrieve the optically encoded data as described above. A light beam may also be directed through the topmost magnetic layer to play back optically encoded data while magnetically recorded data is also accessed from the same surface. In the event optical access is desired only from the top surface, the substrate need not even be transparent.

Figure 5:
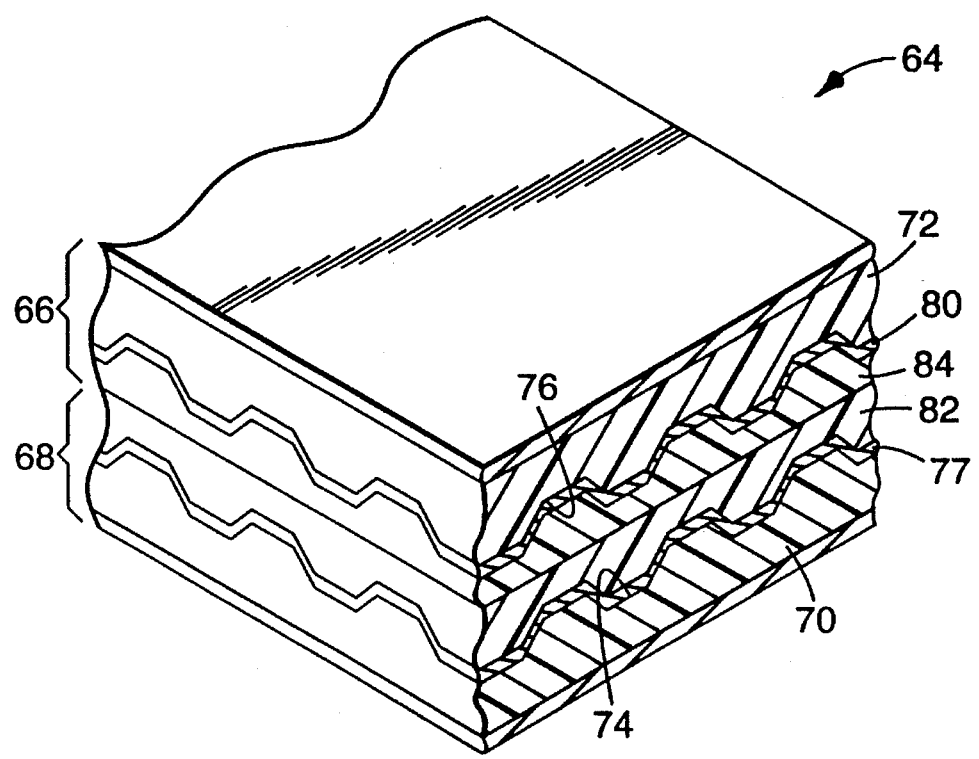
FIG. 5 is a cross-section of yet another tape-like embodiment of the present invention.

One such an embodiment, shown in FIG. 5 as a two-sided medium 64, comprises two, substantially-similar, portions 66 and 68, each of which include a substrate 70 and 72. As in the previous embodiments, one surface 74 and 76 of the substrates carries a replicated pattern overcoated with reflective layers 77 and 80, respectively. In lieu of the protective layers included in the previous embodiments, however, this medium includes bonding layers 82 and 84, respectively. As constructed, the bonding layers are joined such as by a suitable adhesive, or may be thermally fused, depending on the specific materials being employed.

The present invention will now be further illustrated by the following non-limiting examples. (All measures are approximate.)

EXAMPLE NO. 1

A suitable transparent coating may be formed from the following materials:

| Charge | Material | Quantity | % Solids |
|--------|----------|----------|----------|
| A | Cyclohexanone | 1.53 kg | 0.00 |
|   | UR 8200 Urethane | 0.77 kg | 0.59 |
|   | UR 8300 Urethane | 0.77 kg | 0.59 |
|   | GAFAC RE-610 | 0.19 kg | 0.47 |
| B | Sakai SBF-6566 ($BaFe_{12}O_{19}$) | 7.87 kg | 20.00 |
|   | HIT-50 $Al_2O_3$ | 0.28 kg | 0.71 |
| C | Methyl Ethyl Ketone | 6.29 kg | 0.00 |
|   | Myristic Acid | 0.09 kg | 0.24 |
| D | Methyl Ethyl Ketone | 0.94 kg | 0.00 |
|   | Myristic Acid | 0.09 kg | 0.24 |
|   | Butyl Stearate | 0.09 kg | 0.24 |
|   | Total charges | 18.94 kg |  |
|   | Total solids | 9.09 kg | 48.0 |

These charges represented a total solids loading of 85.0 wt % $BaFe_{12}O_{19}$, 3.0 wt % $Al_2O_3$, 5.0 wt % binder at a 50/50 ratio of UR 8200/UR 8300, 2.0 wt % GAFAC RE-610 (dispersant), 2.0 wt % myristic acid, and 1.0 wt % butyl stearate.

After blending together the charges, the resultant solution was diluted down to aliquots that ranged from 10% to 20% in solids content using cyclohexanone as the diluent. Solutions containing 10%, 15% and 20% solids were spin coated at 2000 rpm onto a 14 μm thick polyethylene terephthalate (PET) film. Dry coating thicknesses of about 0.25, 0.38, and 0.50 μm were obtained. The transmission of the respective coatings at 780 nm was 89, 88, and 83%, respectively.

EXAMPLE NO. 2

A magnetic recording layer was prepared as in Example No. 1 using a 10% solids solution and a 14 μm thick polyethylene terephthalate film. The dry coating thickness was about 0.25 μm. A disc-shaped portion was cut from the coated film having dimensions substantially identical to a standard CD-audio disc. This portion was then placed in contact with the read side of the CD, triboelectrically-induced charges being of sufficient magnitude to maintain the two components together. The composite construction was subsequently played back in a conventional CD-audio player, with the playback laser beam being directed through the magnetic layer. The optical recording was reproduced without any evidence of tracking problems. The modulations in the reflective layer comprising the digitized audio information were likewise readily detected and no deterioration in the signal-to-noise ratio was observed.

EXAMPLE NO. 3

A magnetic recording layer was prepared as in Example No. 2, utilizing a 25 μm thick polyethylene terephthalate film. In this instance, the CD player was incapable of tracking or playing back the audio signal when the laser beam was directed onto the magnetic coating.

EXAMPLE NO. 4

A magnetic recording layer was prepared as in Example No. 3, utilizing a film having very low birefringence, and comprising a fluorinated polyether, such as the films described in U.S. Pat. Nos. 4,967,306 and 5,115,372. The film thickness was about 25.4 μm and had a coating thickness of about 0.25 μm. The CD player was readily able to track and play the audio CD. (End of Example 4.)

Figure 6:
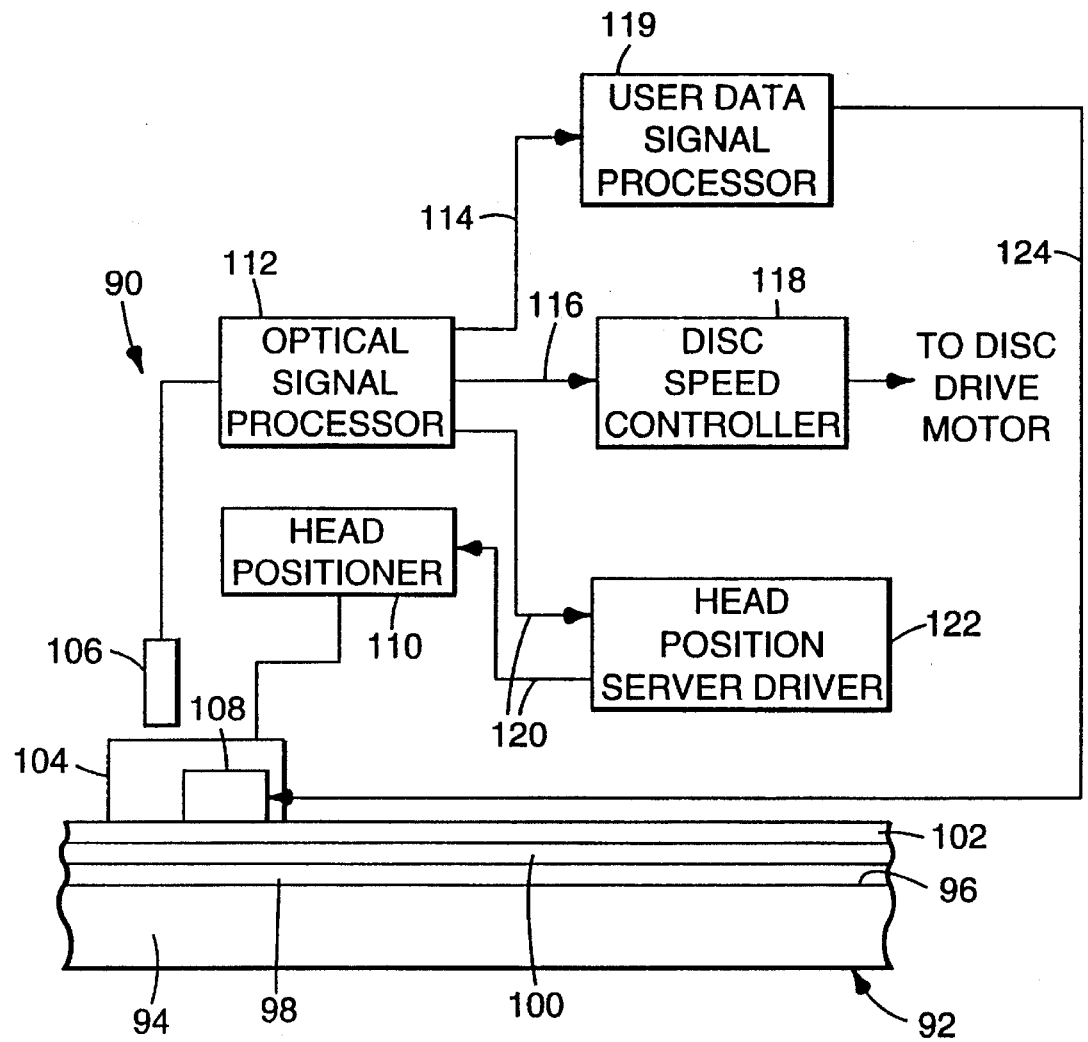
FIG. 6 is a schematic view of a system according to one embodiment of the present invention.

A schematic diagram showing system 90 which uses optical recording media having a magnetic recording layer included is shown in FIG. 6. Medium 92 is comprised of substrate 94 having an upper surface 96 which has been embossed with an optically detectable pattern, a reflectorized layer 98, an optional protective layer (not shown), a polymer layer 100, and a magnetic recording layer 102. Polymer layer 100 is preferably comprised of PET or an acrylate, and is preferably less than about 25 μm thick. Polymer layer 100 preferably provides corrosion protection to reflective layer 98, environmental stability, and helps to adhere the magnetic layer 102 to the medium 92.

As further shown in FIG. 6, a sensing module 104 includes an optical sensor 106 and a magnetic recording/playback head 108. The transverse position of the module 104 relative to the length of the optical and magnetic tracks is controlled by a head positioning mechanism 110 which may include a lead screw or similar mechanism for driving the module 104 in response to positioning signals. Optical signals are detected by the sensor 106, and signals therefrom are coupled to an optical signal processor 112. There, the optical signal is split apart, allowing signal components pertaining to user specific data/information to be output on bus 114 to user data signal processor 119. Also, as compact discs typically operate in a constant linear speed mode, a speed control signal is derived from the detected optical signal and is output on bus 116 to a disc speed controller 118 for ultimately controlling a disc drive motor (not shown).

As particularly relevant to the present invention, the optical signal processor 112 also produces and outputs on bus 120 a head positioning servo signal to the position servo driver 122. This in turn drives the positioning apparatus 110, thus completing the feedback servo loop.

Signals to and from the magnetic recording head 108 are coupled via bus 124 with the user data signal processor 119, enabling additional user data to be recorded and played back concurrently with the detection of the optical signals and derivation therefrom of appropriate servo control signals.

Figure 7:
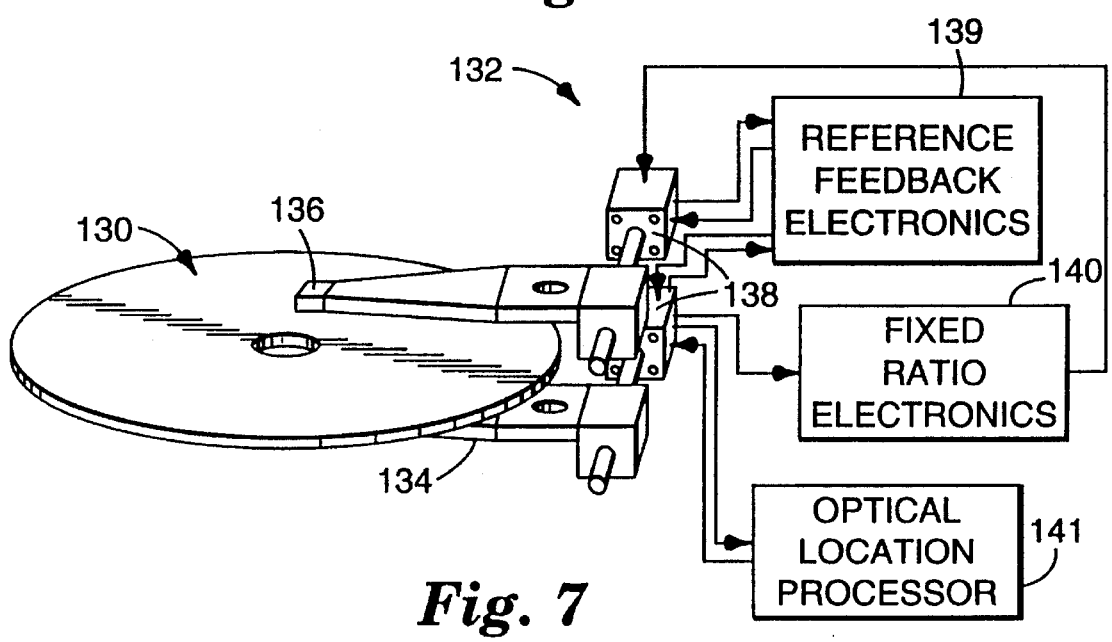
FIG. 7 is a schematic view of a system according to an alternative embodiment of the present invention.

In an alternative system shown in FIG. 7, it will be appreciated that the present invention may include a medium 130 just as described in conjunction with FIG. 6, that is, a medium comprising a CD having a transparent magnetic recording layer on the same side of the substrate as the optically detectable pattern, thereby allowing the optically detectable pattern to be accessed though the magnetic layer. However such a medium may also be used with the apparatus shown in FIG. 7, in which the signal detection apparatus 132 comprises a laser beam/photocell detector 134 positioned below the disc to read the optical pattern through the substrate and a magnetic head assembly 136 for recording on and playing back magnetic signals from the top. In this embodiment, the optical and magnetic detection components are coupled together to a transverse positioning apparatus 138. That apparatus is in turn coupled to a signal processing network which includes reference feedback electronics 139, fixed ratio electronics 140, and optical location processor 141. The signal processing network responds to the detected optical signals by generating transverse position servo control signals, the magnetic record and playback signals, and the like, as in FIG. 6.

Figure 8:
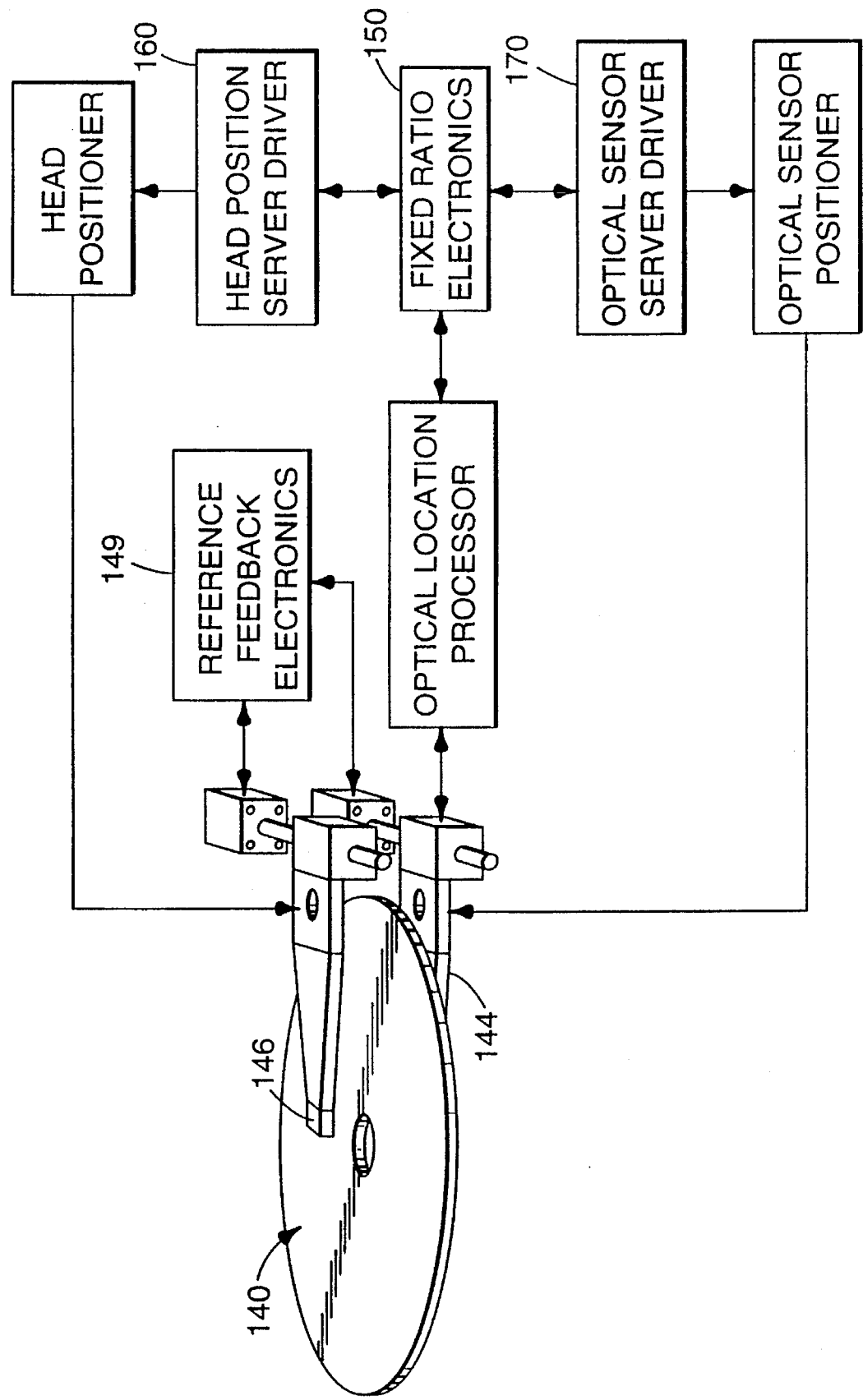
FIG. 8 is a schematic view of a system according to another alternative embodiment of the present invention.

Similarly, as shown in FIG. 8, the medium 140 of the present invention may be like that used in the system of FIG. 7, but the signal detection apparatus 142 may utilize physically separate optical and magnetic sensors. Thus, as shown, such a signal detection apparatus 142 may comprise an optical sensor 144 formed of a laser beam/photocell assembly which is positioned below the medium, together with a magnetic record/playback head 146 positioned on top of the medium. In this embodiment, the servo position control signals are derived from the optically detected pattern 146. The position of the magnetic record/playback head 146 and the optical sensor 144 are controlled via such signals, and the record/playback head 146 and the optical sensor 144 are each separately transversely positioned by a separate positioning apparatus responsive to separate, but electrically-coupled signals. For example, the medium 140 of the invention may be coupled to a signal processing network 142 similar to that utilized in FIGS. 6–7, which includes the reference feedback electronics 149, the fixed ratio electronics 150, and the optical location processor 151. The signal processing network 142 responds to the optical signals detected by the optical sensor 144 by generating position servo control signals which may be used to control separate drivers 160, 170 for the magnetic record/playback head 146, and the optical sensor 144, respectively.

In this configuration, information on the magnetic recording layer can be read or written independently of the optically available information. The optical information is used to provide a reference for positioning the magnetic transducer, i.e., the disc is servoed optically and information is read or written magnetically. Optical sensor 144 and magnetic head 146 can be read at random and used interactively as desired.

The present invention has been described as set forth above in terms of a CD-like medium and a limited number of alternatives in the placement of the transparent magnetic recording layer. It is within the scope of the invention that the media may be in a wide variety of forms, including transparent as well as opaque substrates, disc as well as tape, and that the magnetic layer may be on either side of the substrate and provided as a coating directly on the optical portion, separately coated onto another substrate, and adhered to the optical portion, etc. Similarly, the system of the invention may comprise a wide variety of alternatives by which the optically detectable pattern is detected and a servo control signal is derived for controlling the position of both the optical sensor and the magnetic head.

We claim:

1. A recording system for recording and playing back an information storage medium, comprising:

an optical sensor;

a magnetic recording/playback head;

means for transporting an information storage medium past said sensor and said head; and an information storage medium, comprising:

a substrate having a surface carrying a digitally encoded, detectable pattern in the form of replicated features, wherein said pattern comprises servo tracking signals and user data;

a reflective layer adjacent said pattern for reflecting a beam of radiation modulated by said pattern; and a magnetizable, substantially radiation-transparent magnetic recording layer secured to said substrate;

wherein said optical sensor senses radiation directed through said magnetizable layer which is modulated and reflected by said reflective layer adjacent said pattern, said magnetic head records/plays back information in said magnetizable layer, and said servo tracking signals in said pattern enable independent control of both the optical sensor sensing said pattern and the magnetic recording head on said magnetic recording layer.

2. The system of claim 1, wherein said optical sensor and said magnetic head are provided on opposite sides of said medium.

3. A method of playing back an information storage medium, wherein the medium comprises:

a substrate having a surface carrying a digitally encoded, detectable pattern in the form of replicated features, wherein said pattern comprises servo tracking signals and user data;

a reflective layer adjacent said pattern for reflecting a beam of radiation modulated by said pattern; and a magnetizable, substantially radiation-transparent magnetic recording layer secured to said substrate;

the method comprising the steps of:

transporting the medium past an optical sensor and a magnetic head;

sensing the information stored in said pattern on said medium with said optical sensor, wherein said servo tracking signals in the pattern enable independent control of the position of both the optical sensor sensing said pattern and the magnetic head on said magnetizable layer; and playing back additional information stored in said magnetizable layer in said medium with said magnetic head.

4. A method of updating an information storage medium comprising:

affixing a magnetizable, substantially transparent layer adjacent a surface of a substantially transparent substrate having at least one layer adjacent one surface of said substrate carrying a radiation detectable information bearing pattern; and magnetically recording update information on said magnetizable layer, while previously provided radiation encoded information is recovered by directing a beam of radiation through said magnetizable layer and onto said radiation detectable pattern, wherein said radiation encoded pattern comprises signals for servo tracking, identifying specific record positions on the media, and user data, all in read only memory form, and said method further comprises:

detecting and decoding said radiation encoded pattern;

storing in separate memories signals corresponding to each of said signals;

controlling the position of a beam of radiation and the position of a said magnetic recording head during normal playback operations in response to a said servo tracking signal;

positioning said beam of radiation and head at a desired record location in response to played back user data; and magnetically recording signals on said magnetizable layer at positions dictated by said servo tracking signals and said record position signals.

5. The method of claim 4, further comprising positioning said radiation beam and recording head at specific record locations corresponding to user specific signals indicative of desired magnetically recorded signals.

6. The method of claim 5, comprising playing back desired user specific signals by accessing said radiation detectable pattern and said magnetically recorded signals.

* * * * *